No. 670,269. Patented Mar. 19, 1901.
F. A. CLOUDMAN.
SCREEN VAT.
(Application filed May 17, 1900.)
(No Model.)
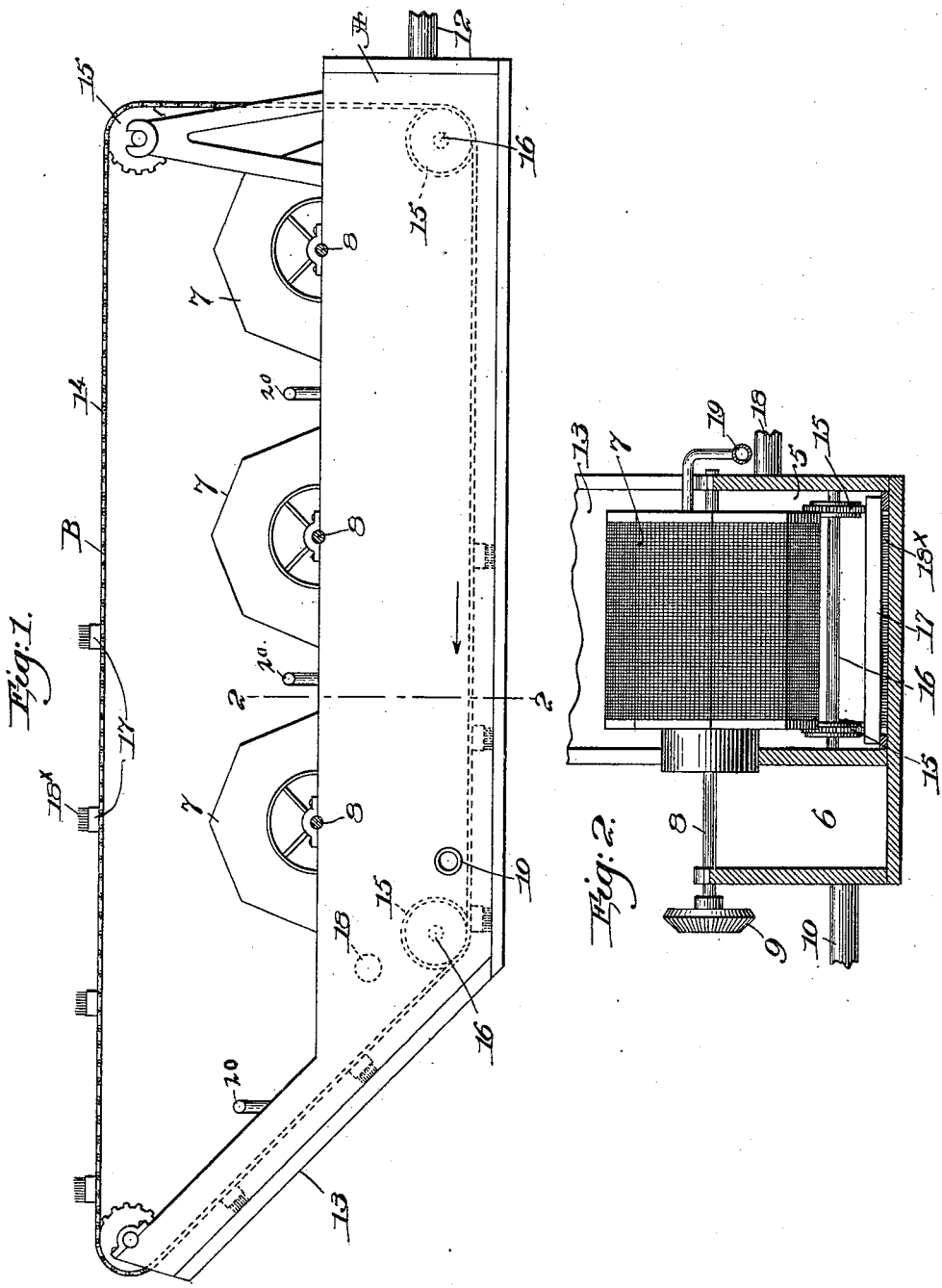
Witnesses,
Edward H. Allen.
Thomas J. Drummond.
Inventor,
Francis A. Cloudman,
by Crosby & Gregory
attys.

UNITED STATES PATENT OFFICE.

FRANCIS A. CLOUDMAN, OF CUMBERLAND MILLS, MAINE.

SCREEN-VAT.

SPECIFICATION forming part of Letters Patent No. 670,269, dated March 19, 1901.

Application filed May 17, 1900. Serial No. 16,978. (No model.)

*To all whom it may concern:*

Be it known that I, FRANCIS A. CLOUDMAN, a citizen of the United States, and a resident of Cumberland Mills, county of Cumberland, State of Maine, have invented an Improvement in Screen-Vats, of which the following description, in connection with the accompanying drawings, is a specification, like charters on the drawings representing like parts.

This invention relates to screen-vats for use primarily in screening or clearing paper stuff or fibers for the manufacture of paper, the construction being such that I am enabled to expel the coarser particles of the mass in the vat therefrom without loss of those portions that are to be utilized in the manufacture of paper.

The vat has therein one or more screening devices arranged to lift the fine material, and I provide means to positively discharge the coarse material from said vat, such coarse material being washed while it is in transit, so as to thoroughly separate therefrom the fine fiber which is to be utilized in making pulp.

In the present case the vat is inclined upward at one end, and I combine with said vat a traveling carrier having teeth adapted to move along near the bottom of the vat, so as to eject therefrom the knots, lumps, strings, &c., and while the latter are in motion they may be washed by water supplied from pipes extending across the vat, so as to remove the adhering fine particles.

The apparatus is shown in one convenient embodiment thereof in the accompanying drawings, wherein—

Figure 1 is a side elevation of a screen-vat involving my improvements; and Fig. 2 is a transverse section of the same in the line 2 2, Fig. 1.

The vat is designated in a general way by A, and it is shown as having two compartments—a main one, as 5, and an auxiliary one, as 6—and one or more screens of suitable kind are arranged within the main compartment.

The screens are denoted by 7, three being shown, and they are preferably constructed similar to those shown and described in Letters Patent No. 197,764, granted December 4, 1877.

The supporting-shafts for the screens are indicated by 8, and they may have bevel-gears, as 9, only one of which is represented, driven by corresponding bevel-gears upon a main shaft. (Not shown.)

The peripheries of the screens are foraminous, and they have internal buckets, as usual. Said screens take up the water and fine material therein from the main compartment 5 and deliver the same into the auxiliary compartment 6, from whence it can flow or be pumped through the discharge or outlet pipe 10.

The inlet or supply pipe is denoted by 12, and it leads into one end of the main compartment 5, it being adapted to supply thereto the mixed stuff for treatment.

The vat is inclined upward at one end, as at 13, and the purpose of the same will hereinafter appear.

It will be understood that the rotary screens 7 take up the fine fibers and deliver the same, with water, into the auxiliary compartment, and to positively discharge the coarse material from the compartment 5 I illustrate a traveling carrier provided with teeth adapted to expel such material, the latter during transit being thoroughly washed, so as to assure separating from the same the desirable fibers.

The carrier is denoted in a general way by B, and it is shown as consisting of two parallel chains or belts, as 14, passing around sprocket-wheels, as 15, carried upon suitably-positioned shafts, as 16, and a desired number of cross-bars or lags, as 17, connected to the respective chains. These lags have upon their outer faces a multiplicity of rake-teeth, as $18^\times$.

In Fig. 1 I have indicated the direction of movement of the carrier B, and when it is in operation the rake-teeth as they move forward near the bottom of the compartment 5 will push the coarse material which has settled thereon along the same and up the incline 13 and from the latter into a suitable receptacle. An overflow-pipe is shown at 18, it leading from the compartment 5 and serving its usual purpose.

To separate the desirable fiber from the coarse material as the latter is fed along the bottom of the compartment 5 and up the incline 13, I provide a series of pipes, as 20, branching from the main or supply pipe 19. The horizontal portions of the pipes have perforations, through which water can flow and onto the mass in said compartment, to thereby wash the fiber that is to be utilized from the sticks, &c., fed along by the carrier B, and the extreme left-hand pipe 20 is arranged over the inclined portion 13, so as to sprinkle the stuff before it is finally discharged.

The invention may be modified within the scope of the accompanying claims.

Having described my invention, what I claim, and desire to secure by Letters Patent, is—

1. A vat having main and auxiliary compartments; one or more screening devices rotative in the main compartment, adapted to lift the fine material therefrom and to deliver the same into the auxiliary compartment; and means to discharge the coarse material from said main compartment.

2. A vat having main and auxiliary compartments; one or more screening devices rotative in the main compartment, adapted to lift the fine material therefrom and to deliver the same into the auxiliary compartment, and a traveling carrier provided with projections to move along near the bottom of the main compartment to expel the coarse material therefrom.

3. A vat having main and auxiliary compartments, one or more screening devices rotative in the main compartment, adapted to lift the fine material therefrom and to deliver the same into the auxiliary compartment; means to discharge the coarse material from said main compartment; and means to wash such coarse material while it is in transit.

4. A vat, one or more screening devices therein adapted to lift the fine material; means to positively discharge the coarse material from said vat, and means to wash such coarse material while it is in transit.

5. A vat inclined upward at one end, one or more screening devices in said vat, and a traveling carrier having teeth arranged to move along near the bottom of the vat and up said incline to positively discharge the coarse material from said vat.

6. A vat inclined upward at one end, one or more screening devices in said vat, a traveling carrier having teeth arranged to move along near the bottom of the vat and up said incline to positively discharge the coarse material from said vat, and means for washing such coarse material while it is on the incline.

7. A vat adapted to contain material to be screened, one or more rotative screens arranged in said vat, a traveling carrier having teeth to discharge the coarse material from the bottom of the vat, and one or more water-supply pipes to deliver water to the vat for washing the coarse material.

8. A vat adapted to contain material to be screened, one or more screens arranged in said vat and adapted to screen the material and discharge the screened portions of the same from the vat, a traveling carrier having teeth to discharge the coarse unscreened material from said vat, and one or more water-supply pipes to deliver water to the vat for washing the coarse material.

In testimony whereof I have signed my name to this specification in the presence of two subscribing witnesses.

FRANCIS A. CLOUDMAN.

Witnesses:
HEATH SUTHERLAND,
EDITH M. STODDARD.